United States Patent [19]

Langager et al.

[11] 4,152,165

[45] May 1, 1979

[54] ONE-PART HYDROPHILIC TREATMENT COMPOSITIONS

[75] Inventors: Bruce A. Langager, New Brighton, Minn.; Boyd R. Beck, Spring City, Utah; Frank T. Sher; George V. D. Tiers, both of Saint Paul, Minn.

[73] Assignee: Minnesota Mining and Manufacturing Company, Saint Paul, Minn.

[21] Appl. No.: 895,527

[22] Filed: Apr. 11, 1978

[51] Int. Cl.$^2$ ............................................. C09K 3/18
[52] U.S. Cl. ........................................ 106/2; 106/13; 106/287.11; 106/287.12; 106/287.14; 260/29.2 M; 260/37 SB; 260/448.2 N; 260/448.8 R; 252/135; 51/298
[58] Field of Search ............... 106/2, 12, 13, 287.11, 106/287.12, 287.14; 260/29.2 M, 448.2 N, 448.8 R, 37 SB, 2.5 S; 526/23; 51/298; 252/135

[56] References Cited

U.S. PATENT DOCUMENTS

| | | | |
|---|---|---|---|
| 3,215,718 | 11/1965 | Ryan | 260/448.2 N |
| 3,328,449 | 6/1967 | Haluska | 260/46.5 E |
| 3,565,851 | 2/1971 | Neuroth | 260/37 SB |

*Primary Examiner*—Lorenzo B. Hayes
*Assistant Examiner*—W. Thompson
*Attorney, Agent, or Firm*—Cruzan Alexander; Donald M. Sell; James V. Lilly

[57] ABSTRACT

One-part hydrophilic treatment compositions are provided which comprise (i) an aqueous solution of a sulfonato-organosilanol compound which has at least one sulfonato-organic substituent therein, and (ii) an abrasive material. These compositions are particularly useful in imparting hydrophilicity to siliceous surfaces.

22 Claims, No Drawings

ONE-PART HYDROPHILIC TREATMENT COMPOSITIONS

BACKGROUND OF THE INVENTION

This invention relates to compositions useful in the treatment of siliceous surfaces. More particularly it relates to one-part compositions which clean and activate siliceous surfaces and impart durable hydrophilicity to said surfaces.

Although various types of compositions have been suggested for use in imparting hydrophilicity to various substrates, all of such previously suggested materials have been less than desirable for one reason or another. For example, some of the earliest suggested compositions for such use comprised anionic or non-ionic surfactants (e.g., triethanolammonium oleate, sodium lauryl sulfate, sodium dodecylbenzenesulfonate, polyoxyalkylene sorbitol). These surfactants have been described for use in either solid or aqueous solution form. However, the major disadvantage associated with the use of such compositons is that the hydrophilicity and antifogging properties imparted by the surfactants simply do not exhibit very good durability during use, (i.e., they are easily dissolved by water and removed from the surface). Consequently, in order for such compositions to be effective they must be reapplied to the surface at frequent intervals.

Another type of surfactant which has been described for use in imparting hydrophilic properties is one containing a terpolymer of dimethyl silicone, polyethylene oxide, and polypropylene oxide. This type of surfactant, which is described, for example, in U.S. Pat. 3,337,351, suffers from the same drawbacks as discussed above, namely easy dissolution by water.

Still another type of surface active agent is described in U.S. Pat. No. 3,187,033. This type of material contains S—C bonded sulfo groups and displays physical and chemical properties similar to soaps. Thus, for example, these materials exhibit substantial surface tension lowering capabilities.

U.S. Pat. No. 3,507,897 describes siloxane surface active agents in aqueous media. These solutions preferably have a pH of from 5 to 8 so that the agents do not degrade. Additionally, these agents are said to exhibit excellent surface tension lowering capabilities.

U.S. Pat. No. 3,328,449 describes sulfopropylated, organofunctional silane and siloxane materials which are useful as detergents, ion exchange resins, wetting agents, anti-stat agents and polymerization catalysts for siloxanes. It is said that these materials may be provided in solution form and that suitable solvents include water. However, it is also said that such solvents must not react with the solute. There is no discussion therein of stable aqueous solutions of sulfonato-organosilanols or of siliceous surfaces rendered hydrophilic by treatment therewith.

U.S. Pat. No. 3,455,877 describes organosilicon epoxides wherein the epoxy group (or the radical containing the epoxy group) is attached to silicon by a Si-C linkage. These materials are said to be useful as emulsifiers, plasticizers, lubricants, etc. They are also said to be useful in preparing hydroxy sodium sulfonates by reacting the epoxides with sodium sulfite. There is no discussion of the preparation of stable aqueous solutions of such compounds or of the durably hydrophilic surfaces produced by contacting such compositions with siliceous surfaces.

The present invention provides compositions which are useful for cleaning, activating and imparting durable hydrophilicity to siliceous surfaces. The compositions of the present invention are particularly useful in imparting hydrophilicity to surfaces where easy grease and wax removal is desired or required. Thus, for example, the compositions are useful in treating glass surfaces such as household windows, automobile windshields and windows, eyeglasses and bathroom mirrors; glazed ceramic surfaces such as ceramic tile and ceramic bathroom fixtures and enamelled iron surface.

Siliceous surfaces treated in accordance with the present invention are not rendered grease or wax repellent, (i.e., they are not made oleophobic). Consequently, greases and waxes may attach to the treated surfaces. However, the treated surfaces are rendered readily cleanable so that grease and wax may be removed therefrom by simple water rinsing alone although very light rubbing may also be helpful in some instances.

Because the composition of the present invention impart durable hydrophilicity to siliceous surfaces, such surfaces may be readily cleaned even after having been repeatedly previously soiled or marked by grease or wax and then cleaned. Moreover, the treated surfaces are substantially easier to clean than are surfaces which have not been so treated.

Examples of greases and waxes which have been found to be readily removable from surfaces treated in accordance with the present invention are butter, margarine, lard, natural sebum (skin oil), artificial sebum, motor oils, motor greases, paraffin wax and wax pencil marks. Still other substances such as elastomer-based adhesives, pressuresensitive adhesives, thermoplastic (solvent soluble) adhesives, thermosetting adhesives, epoxy adhesives, silicone based adhesives, etc., are readily removable from surfaces treated in accordance with the present invention.

The compositions of the present invention comprise aqueous solutions of a sulfonato-organosilanol compound. Surprisingly, such compositions are stable over long periods of time even at relatively high concentrations of the sulfonato-organosilanol compounds (e.g., 10% to 15% by weight). Thus, the treatment activity of the compositions is retained and no precipitate of the silanol compound is formed therein upon prolonged storage. Moreover, various concentratons of the sulfonato-organosilanol compounds may be employed in the compositions of the invention.

Additionally the preferred compositions of the invention provide thin, durable antifogging coatings on the siliceous surfaces. Thus individual water droplets will not form and remain on surfaces treated with said solutions (i.e., said surfaces do not fog over) despite repeated exposures to conditions of high humidity.

Surprisingly the foregoing results are achieved even though the sulfonato-organosilanol compounds employed do not exhibit typical surfactant characteristics. Thus these compounds have no significant effect upon the surface tension of aqueous media. Moreover these results are provided even though the compositions of the invention also clean and activate the siliceous surface while at the same time rendering it hydrophilic.

SUMMARY OF THE INVENTION

In accordance with the present invention there are provided novel one-part compositions for providing hydrophilicity to siliceous surfaces. These compositions comprise (i) a sulfonato-organosilanol compound (sometimes referred to hereinafter as a sulfonato-silanol) and (ii) an abrasive material. The sulfonato silanol contains at least one sulfonato-organic substituent; and additionally contains at least about 30% by weight oxygen and no more than about 15% by weight silicon. These percentages are taken with reference to the water-free acid form of the compound. As it is used herein, the acid form of the compound refers to a compound which has a sulfonato substituent of the formula —SO$_3^-$H$^+$. All percentage determinations with respect to oxygen and silicon are calculated relative to this form whether or not the compound under discussion is itself the acid form or is present in an aqueous solvent and/or as a salt of the acid.

As it is used herein, the term "aqueous solution" refers to solutions containing water. Such solutions may employ water as the only solvent or they may employ combinations of water and organic solvents such as alcohol and acetone. Moreover substantial amounts of the organic solvents may be included in the combinations.

DETAILED DESCRIPTION OF THE INVENTION

The sulfonato-organosilanol compounds useful in the present invention and methods for their preparation are described more fully in copending application Ser. No. 895,528, filed Apr. 11, 1978 and assigned to a common assignee. The disclosure of this copending application is incorporated herein by reference. These sulfonato-silanols may be prepared by converting the corresponding precursor organic silane to the organosilanolate or the organosilanol-sulfonic acid salt followed by subsequent conversion to the desired product (if necessary).

The sulfonato-organosilanol compounds useful in the present invention have the formula

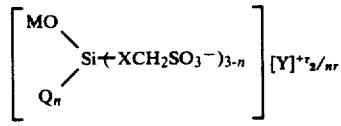

(I)

wherein Q is selected from hydroxyl, alkyl groups containing from 1 to about 4 carbon atoms and alkoxy groups containing from 1 to about 4 carbon atoms;

M is selected from hydrogen, alkali metals and organic cations of strong organic bases having an average molecular weight of less than about 150 and a pK$_a$ of greater than about 11;

X is an organic linking group;

Y is selected from hydrogen, alkaline earth metals, (e.g., magnesium, calcium, etc.) organic cations of protonated weak bases having an average molecular weight of less than about 200 and a pK$_a$ of less than about 11 (e.g., 4-aminopyridine, 2-methoxyethylamine, benzylamine, 2,4-dimethylimidazole, 3[2-ethoxy(2-ethoxyethoxy)]propylamine). alkali metals and organic cations of strong organic bases having an average molecular weight of less than about 150 and a pK$_a$ of greater than about 11 (e.g., $^+$N(CH$_3$)$_4$, $^+$N(CH$_2$CH$_3$)$_4$), provided that M is hydrogen when Y is selected from hydrogen, alkaline earth metals and organic cations of said protonated weak bases;

r is equal to the valence of Y; and n is 1 or 2.

The weight percentage of oxygen in these compounds is at least about 30%, and preferably at least about 40% Most preferably it is in the range of about 45% to 55%. The weight percentage of silicon in these compounds is no greater than about 15%. Each of these percentages is based on the weight of the compound in the water-free acid form.

The organic linking group X of the sulfonato-silanol is a divalent radical. Preferably it is selected from alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkyarylene groups and substituted alkylarylene groups. Most preferably X is selected from alkylene groups, hydroxy substituted alkylene groups and hydroxy-substituted mono-oxa alkylene groups.

Preferably, the compositions of the invention have a concentration of the sulfonato-silanol compounds in the range of about 1% to 3% by weight. Lower or higher concentrations of the compounds may be used (e.g., 0.1% to 30% or higher) if desired.

A number of sulfonato-silanols are included within the purview of formula I. One class of such silanols are the organosilanol-sulfonic acids. These compounds have the formula

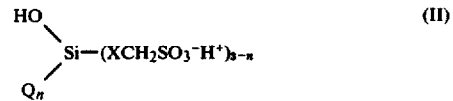

(II)

wherein Q, X and n are each as described above. Examples of organosilanol-sulfonic acids of formula II are

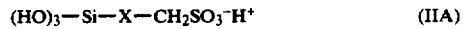 (IIA)

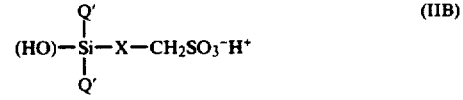 (IIB)

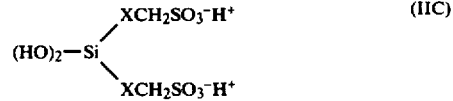 (IIC)

In these formulae X is as described above and Q' is an alkyl group which contains from 1 to about 4 carbon atoms. Representative compounds of of formulae IIA, IIB and IIC include:

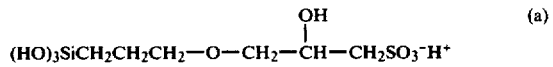 (a)

 (b)

 (c)

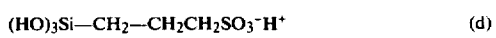 (d)

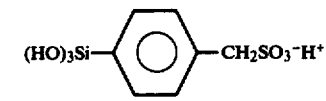 (e)

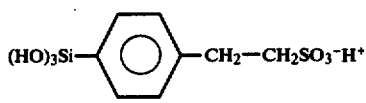 (f)

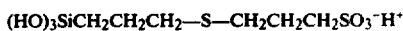 (g)

(HO)₃SiCH₂CH₂CH₂—S—CH₂CH₂CH₂SO₃⁻H⁺

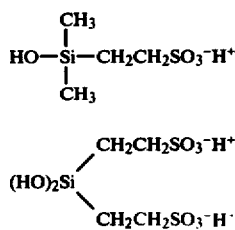 (h)

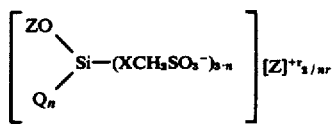 (i)

Of these specific compounds, those of formulae (a), (c), (d) and (i) are preferred. Compound (d) is a particularly preferred compound.

The aqueous solutions of the organosilanol-sulfonic acids employed in the compositions of the invention are acidic. Thus they have a pH of less than about 5. Preferably they have a pH of less than about 3. Most preferably they have a pH in the range of about 0.5-2.5.

The organosilanolate-sulfonic acid salts represent another class of compounds within the purview of formula I. These compounds have the formula $$\left[ \begin{array}{c} ZO \\ \diagdown \\ Si-(XCH_2SO_3^-)_{3-n} \\ \diagup \\ Q_n \end{array} \right] [Z]^{+r}{}_{3/nr} \quad \text{(III)}$$

wherein Q, X, n and r are each as defined above, and wherein Z is selected from alkali metals and organic cations of strong organic bases having an average molecular weight of less than about 150 and a pK$_a$ of greater than about 11. Examples of organosilanoate-sulfonic acid salts of formula III are

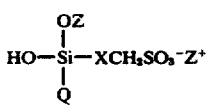 (IIIA)

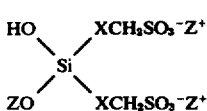 (IIIB)

Representative compounds of formulae IIIA and IIIB include:

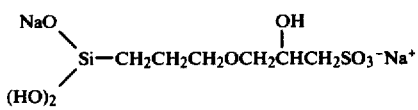 (a)

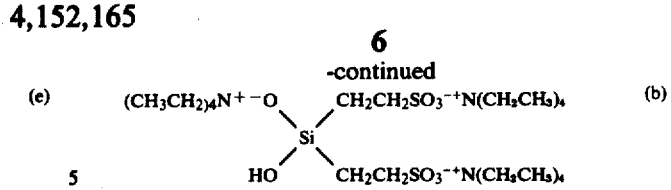 (b)

The aqueous solutions of the organosilanolate-sulfonic acid salts employed in the compositions of the invention are basic. Thus they have a pH of greater than about 9. Preferably they have a pH of greater than about 10. Most preferably they have a pH in the range of about 11-13.

The organosilanol-sulfonic acid salts represent yet another class of compounds within the purview of formula I. These compounds have the formula

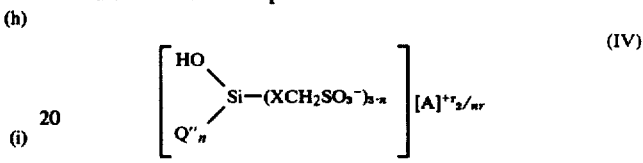 (IV)

wherein X, n and r are each as described above, Q″ is selected from hydroxyl and alkyl groups containing from 1 to about 4 carbon atoms and A is selected from alkaline earth metals, organic cations of protonated weak bases having an average molecular weight of less than about 200 and a pK$_a$ of less than about 11, alkali metals and organic cations of strong organic bases having an average molecular weight of less than about 150 and a pK$_a$ of greater than about 11. Examples of organosilanol-sulfonic acid salts of formula IV are

 (IVA)

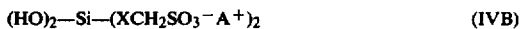 (IVB)

Representative compounds of formulae IVA and IVB include:

 (a)

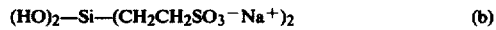 (b)

The aqueous solutions of the organosilanol-sulfonic acid salts employed in the compositions of the invention are neutral. Thus they have a pH in the range of about 5 to 9. Preferably they have a pH in the range of about 6 to 8.

The abrasive materials (sometimes also referred to herein as polishing agents) comprise at least about 1% by weight of the composition. Preferably they comprise from about 5% to 10% by weight of the composition, although higher amounts (e.g., 60%) may be employed if desired. The abrasive materials useful in the present invention may have a variety of particle sizes. However, it is preferred that they not be so large as to visibly abrade the surface which is treated.

The exact abrasive material selected for use is dependent upon the acidity of the aqueous solution. Thus acidic abrasive materials are employed when acidic sulfonato-silanols (i.e. organosilanol-sulfonic acids) are employed. Basic abrasive materials are employed when basic sulfonato-silanols (i.e., organosilanolate-sulfonic acid salts) are employed. Acidic or basic abrasive materials may be employed when neutral sulfonato silanols (i.e., organosilanol-sulfonic acid salts) are employed. Representative examples of useful abrasive materials or polishing agents include amorphous silica (e.g., "IM-SIL" A-10, A-15 and A-25, commercially available from Illinous Mineral Company), calcium carbonate, talc, silicon carbide, aluminum oxide, α-quartz, alumina, zirconium oxide, cerium oxide, etc.

The compositions of the present invention may be used to impart hydrophilicity to a wide variety of substrates having siliceous surfaces with closely adjacent SiOH sites. Example of such surfaces include window glass, mirror glass, borosilicate glass, lead glass, fused silica, soda glass, glazed ceramics and ceramic tiles, ceramic electrical insulations, decorative ceramics, porcelain ware, china ware, bone china, natural quartz, granite, feldspar, beryl, obsidian, enamelled iron and agate.

The siliceous surfaces may be easily rendered durably hydrophilic in accordance with the present invention. Thus, a composition of the invention is applied to said surface under mild conditions (e.g., 10° C. to 60° C. at atmospheric pressure) followed by simple drying at room temperature (e.g., 23° C.) to obtain the hydrophilic properties. Typically drying involves buffing the treated surface with a soft dry cloth, or rinsing the surface with water, so as to remove abrasive material left behind from application of the composition and then air drying.

No catalyst or curative is needed in order to obtain the hydrophilic properties. Moreover, because the compositions of the invention contain an abrasive material it is unnecessary to clean and activate the surface prior to treatment with the compositions of the invention.

The one-part nature of the present invention also provides other advantages. Thus, it has been found that the amount of the sulfonato-organosilanol compound which bonds to the siliceous surface tends to be reduced as the length of time between cleaning and treatment with the sulfonato-silanol step is increased. Moreover, such a delay also tends to diminish the durability of the hydrophilic surface. However, by providing a one-part composition, the present invention allows cleaning, activation and treatment the siliceous surface to be effected simultaneously thereby providing a convenient mode of use.

It is preferred that the treated surface is allowed to remain dry for a period of time before it is soiled or rinsed. During this time the sulfonato-organosilanol compound interacts with the siliceous surface and forms a durable hydrophilic layer thereon. At this point the treated surface may be described as "conditioned". It is believed that the hydrophilic layer is formed when the

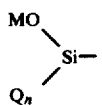

portion of the sulfonato-silanol reacts with available Si—OH sites on the siliceous surface to form Si—O—Si bonds thereon.

The treated surfaces are rendered effectively durably hydrophilic within a relatively short period of time after dryness has been obtained. For example, when the organosilanol-sulfonic acids are employed in the compositions, the surface may be rendered durably hydrophilic after as little as one minute of conditioning. However, typically about 15 minutes of conditioning time is preferred. When the organosilanolate-sulfonic acid salts are employed the surface of the treated substrate is rendered durably hydrophilic after about 24 hours of conditioning. The degree of hydrophilicity of these surfaces tends to continue to improve over the first few days after treatment. When the organosilanol-sulfonic acid salts are employed, the treated surface is rendered durably hydrophilic after about 2 hours of conditioning. The degree of hydrophilicity of these surfaces tends to continue to improve over the first few hours after treatment.

Although the compositions of the invention can be used to impart a high degree of hydrophilicity to a surface, it is also possible to convert the resulting hydrophilic surface to a hydrophobic surface by means of ion exchange. That is, the hydrophilic surface may be rinsed or otherwise contacted with certain cationic surfactants (e.g., quaternary fatty amines, etc.) so that the sulfonato-organosilanol compound bonded to the surface of the substrate is converted to a salt of an organic cation bearing a hydrophobic tail. The process is totally reversible and, accordingly, the surface may be converted back to a very hydrophilic state again (e.g., by treatment with aqueous alkali salt solutions) as desired.

The compositions of the present invention may be provided in a variety of viscosities. Thus, for example, the viscosity may vary from a water thinness to a paste-like heaviness. They may also be provided in the form of gels. Additionally, a variety of other ingredients may be incorporated in the compositions. Thus, for example, conventional anionic surfactants and detergents and suspending or thickening agents may be included therein.

The anionic surfactants and detergents useful in the compositions of the invention typically comprise up to about 5% by weight thereof. Preferably they comprise from about 0.1 to 1% by weight thereof. More or less of the surfactants or detergents may be utilized if desired. Representative examples of useful surfactants or detergents include sodium dodecylbenzenesulfonate ("Siponate"]DS-10 available from Alcolac Incorporated), sodium dodecyldiphenylosidedisulfonate ("Dowfac" 2A1 available from Dow Chemical Company), sodium dodecyl sulfate, $C_8F_{17}SO_3H$, sodium dioctylsulfosuccinate, (Aerosol ® OT, available from American Cyanamid Company), sodium heptadecyl sulfate (Tergitol ® Anionic 7, commercially available from Union Carbide Corporation).

The suspending or thickening aids useful in the present invention must be compatible therewith. Consequently they must maintain the abrasive material (described above) in an easily redispersible state for an extended period of time (e.g., 12 months or more). Thus useful thickening aids prevent the formation of a hard cake of abrasive material in the compositions. Additionally, the suspending or thickening aids must be functionally stable in the compositions of the invention, that is, they do not degrade therein or adversely affect the performance of the composition.

The suspending or thickening aids useful in the invention typically comprise up to about 5% by weight of the composition. Preferably they comprise from about 0.1% to 1% by weight of the composition. However, more or less of such aids may be employed if desired. Representative examples of useful thickening or suspending aids include magnesium aluminum silicates such as "Veegum" HV, K and T available from R. T. Vanderbilt Company, "Gel White" GT and "Mineral Colloid MO" available from Georgia Kaolin Company, and "Ben-A-Gel" available from National Lead Industries. Other useful suspending or thickening aids include fumed silica such as Cab-O-Sil ® M-5 available from Cabot Corporation and xanthan gums such as "Keltrol" available from Kelco Corporation.

Solvents may also be included in the hydrophilic treatment compositions so as to improve their freeze-thaw stability. Typically the solvents comprise up to about 40% by weight of the compositions and preferably in the range of about 5-50% by weight of the compositions. Representative examples of useful solvents include the lower alcohols such as methanol, ethanol, propanol, 2-propanol, etc. A variety of other solvents might also be used as will be apparent from this specification.

The hydrophilic layer obtained by the treatment described hereinbefore is transparent, haze-free, thin and durable. Thus, for example, a glass surface which has been treated with a composition of the present invention possesses optical qualities comparable to those of a non-treated but cleaned glass surface. That is, both the reflectance and transmission of the treated glass surface are essentially identical to those of the untreated glass surface.

Moreover, these hydrophilic layers are extremely thin, being less than about 100 nanometers thick. The thinness of the layers may be shown by a variety of techniques such as X-ray Photoelectron Spectroscopy (ESCA), Ion Scattering Spectroscopy (ISS), Secondary Ion Mass Spectrometery (SIMS), radiolabeled $^{35}S$ and ellipsometry. These techniques indicate that the hydrophilic layer is less than 100 nanometers thick and often corresponds to a thinness calculated to be in the range of 1 to 2 molecular layers of the sulfonato-organosilanol compound used in the aqueous treatment composition.

A variety of techniques may be employed to demonstrate the durability of hydrophilic treatment imparted to siliceous surfaces by compositions of the invention. These techniques include the use of a Cationic Dye Exchange test and a Spreading Water Drop test. Typically these tests are employed in conjunction with a Cyclic Wear test. These techniques are now described in more detail.

Cationic Dye Exchange Test

A section of a siliceous surface to be tested is contacted with an excess of a 0.01 molar solution (pH of 4) of a cationic dye (U.S.P. methylene blue (chloride) dye) in deionized water. The dye solution is allowed to dry thereon and bind to the surface of the section. The section is then rinsed with deionized water to remove any unbound dye, the remaining bound dye is then removed from the surface by carefully rinsing it with 3 ml of a 0.5% by weight solution of the potassium salt of perfluoro(ethylcyclohexane) sulfonic acid in absolute ethanol. The rinse solution is collected and the dye concentration therein determined by measuring the spectrophotometric absorbance thereof in a 10 mm cell at a wavelength of 655 nanometers (nm). A high absorbance in the rinse solution indicates that there is a high level of sulfonato-organosilicon compound of the surface of the section. Direct densitometry may also be utilized to measure dye binding.

Siliceous substrates treated in accordance with the present invention bind at least about 50% (and preferably at least about 100%) by weight more of the methylene blue dye expressed as the chloride than do the respective normal siliceous surfaces. Normal siliceous surfaces are those which are clean and equilibrated and free of hydrophilic treatments and other foreign matter. Normal surfaces may be prepared by a process of normalization wherein the surface has been cleaned and activated and then allowed to equilibrate over a 24 hour period in an ambient atmosphere at room temperature. The cleaning and activating may involve abrasive polishing, treating with acidic or basic solutions, or flame (heat) treatment followed by rinsing with deionized water and careful drying at ambient (e.g., 23° C.) temperature. For example, normalization may be achieved by (i) soaking the treated surface in a chromic/sulfuric acid cleaning solution at about 23° C. for 16 hours, (ii) rinsing it with deionized water and (iii) air drying it at about 23° C. for 24 hours. This latter treatment is especially suited for removing existing hydrophilic organic layers to permit comparison measurements of normalized siliceous substrates.

Spreading Water Drop Test

A section of a siliceous surface to be tested is either cleaned and activated with an aqueous slurry of an abrasive material or cleaned, activated and rendered hydrophilic with a composition of the invention. The hydrophilicaly treated surface is allowed to condition for the desired time. A one microliter (1.0 μl) drop of deionized water is placed on the appropriate horizontally oriented siliceous surface. The area covered by the drop of water is then determined. An area of coverage of less than about 10 mm² is indicative of a nonhydrophilic surface while an area of coverage of more than about 10 mm² is indicative of a hydrophilic surface (i.e., one exhibiting grease and wax release). As the degree of hydrophilicity of the treated surface increases the area of coverage also increases. Thus an area of 12 mm² or more is indicative of a hydrophilic surface having easy grease and wax release while an area of 15 mm² or more is indicative of a surface having good anti-fogging characteristics.

Cyclic Wear Test

A surface to be tested is placed in a Gardner Straight Line Washability and Abrasion Machine. A pad of wet cheesecloth under a pressure of about 4 kilopascals thereon is placed over the surface and passed back and forth repeatedly thereover. Each cycle equals one back and forth pass of the cheesecloth pad.

The foregoing invention is further illustrated by means of the following examples wherein all amounts are parts by weight unless otherwise noted. In these examples the sulfonato-silanol employed was either an organosilanolate-sulfonic acid salt of the formula

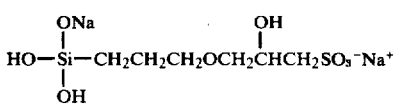

or an organosilanol-sulfonic acid of the formula

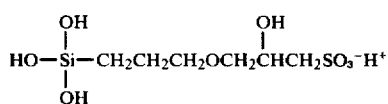

The organosilanolate-sulfonic acid salt was prepared as follows. A solution comprising 0.5 gram (g) gammaglycidoxy-propyltrimethoxy silane and 2.5g methanol was added slowly to a solution of 0.27g sodium sulfite ($Na_2SO_3$) and 5g water. The mixture was stirred and reacted at 50° C. for 16 hours. The pH of the final reaction mixture was 12.8.

The organosilanol-sulfonic acid was prepared by passing a solution of the above-described organosilanolate-sulfonic acid salt through an excess of the acid form of Amberlite ® IR-120 (an ion exchange resin commercially available from Rohm and Haas Company). This provided a solution having a pH of 1.6.

EXAMPLES 1-3

One part cleaner-hydrophilic treatment compositions according to the invention were prepared and applied to separate test panels of single strength window glass with a cheesecloth pad using light pressure and a circular polishing pattern for about 30 seconds. The panels were then buffed dry with a clean, dry pad of cheesecloth and conditioned for 20 minutes at about 23° C. The durability of the resulting hydrophilic treatments was demonstrated by the Spreading Water Drop Test. An initial determination (i.e., before challenge in the Cyclic Wear Test) and a determination after various numbers of challenges in the Cyclic Wear Test was made. The formulations employed and the results obtained from the "Spreading Water Drop" test are set forth in Table 1.

TABLE 1

| FORMULATION (parts by weight) | 1 | 2 | 3 |
|---|---|---|---|
| $(HO)_2Si(OH)CH_2CH_2CH_2OCH_2CHCH_2SO_3^-H^+$ with OH groups | 2 | 2 | 2 |
| Abrasive Material | | | |
| Imsil A-25 (amorphous silica, 99.9% by weight passes through a 400 mesh screen, available from Illinois Minerals Company) | 10 | 10 | 10 |
| Thickening Aid | | | |
| Keltrol (a xanthan gum, available from Kelco Corporation) | 1 | 1 | 1 |
| Surfactant | | | |
| Siponate DS-10 (sodium dodecylbenzenesulfonate, available from Alcolac, Incorporated) | 0.2 | 1 | 5 |
| Solvent | | | |
| 2-propanol | 5 | 5 | 5 |
| Deionized Water | 81.8 | 81 | 77 |
| Spreading Water Drop* (Area in $mm^2$) | | | |
| Initial (0 cycles) | 13.4 | 14.7 | 20.6 |
| 10 Cycles | 13.4 | 16.1 | 16.1 |
| 25 Cycles | 13.4 | 18.3 | 16.1 |
| 100 Cycles | 13.4 | 15.4 | 14.0 |
| 500 Cycles | 10.3 | 13.4 | 14.7 |

*A cleaned but untreated glass panel which was not subjected to the Cyclic Wear Test had a "Spreading Water Drop" Test area of about 8 $mm^2$.

A Reliance ® All-Surface Writer, White No. 3366 was used to make a wax mark on each of the glass panels after 500 cycles. The mark was easily removed from the panels by simply rinsing them with a stream of water from a wash bottle. An untreated panel required rinsing with a stream of water and vigorous rubbing in order to remove the wax pencil mark.

EXAMPLES 4-8

One-part cleaner-treatment compositions were prepared which comprised 2% by weight of an organosilanolsulfonic acid of the formula

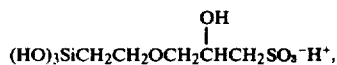

$(HO)_3SiCH_2CH_2OCH_2CHCH_2SO_3^-H^+$, with OH

10% by weight of various abrasive materials, 1% by weight of "Keltrol" thickener and 87% by weight of diluent (82% water and 5% isopropyl alcohol).

About 0.5g of each composition was applied to a separate piece of single strength window glass (7.6cm by 7.6cm) with a pad of cheesecloth using light pressure and a circular polishing motion for about 30 seconds. This procedure cleaned, activated and treated the glass. The test panels were then buffed dry with a piece of clean, dry cheesecloth and conditioned for about 20 minutes at about 23° C. They were tested for the durability of the hydrophilic treatment. A blank test panel (i.e., one having been cleaned but not made hydrophilic) was used as a control. The blank panel was cleaned with a water slurry of Imsil A-25 amorphous silica from Illinois Mineral Company. Durability was shown by the Dye Exchange Test and the Cyclic Wear Test. The absorbance of the rinse solution was determined both initially and after the treated surface had been subjected to the Cyclic Wear Test. The abrasive materials used in the treatment compositions and the results of the Test are set forth in Table 2.

TABLE 2

| EXAMPLE | ABRASIVE MATERIAL | ABSORBANCE OF EXCHANGED DYE AFTER CHALLENGES | | | | | | |
|---|---|---|---|---|---|---|---|---|
| | | INITIAL | 10 CYCLES | 25 CYCLES | 50 CYCLES | 100 CYCLES | 250 CYCLES | 500 CYCLES |
| 4 | I | .75 | .54 | .50 | .49 | .42 | .48 | .47 |
| 5 | II | .82 | .55 | .51 | .45 | .43 | .42 | .43 |
| 6 | III | .82 | .59 | .56 | .55 | .52 | .51 | .44 |
| 7 | IV | 1.03 | .64 | .63 | .51 | .49 | .48 | .46 |
| 8 | Control | .36 | .36 | .42 | .44 | .42 | .36 | .36 |

I. Imsil A-10 amorphous silica (99% by weight less than 10 µm in size, available from Illinois Minerals Company)
II. Imsil A-15 amorphous silica (99% by weight less than 15 µm in size, available from Illinois Minerals Company)
III. Imsil A-25 amorphous silica (99.9% by weight pass through a 400 mesh screen, available from Illinois Minerals Company)
IV. α-Quartz particles extracted from Ajax ® Brand household cleanser.

As can be seen from this data, a significant amount of the hydrophilic layer is present on the treated surfaces even after 500 cycles in the Cyclic Wear Test. This is evidenced by the fact that even after 500 cycles in the Cyclic Wear Test glass panels treated with the compositions of the invention have an absorbance of more than 40% of their initial absorbance. This demonstrates the durability of the hydrophilic layer.

A Reliance ® All-Surface Writer, White No. 3366 was used to make a wax mark on each of the glass panels after 500 abrasion cycles. The mark was easily removed from the treated panels with a stream of water from a wash bottle and gentle rubbing. However, the control panel required rinsing and vigorous rubbing in order to remove the mark.

EXAMPLES 9-11

Three one-part compositions were prepared. The composition of Example 9 was a one-part cleaner-hydrophilic treatment composition according to the invention. The compositions of Examples 10 and 11 were surfactant compositions (i.e., they contained no sulfonato-silanol). Each composition was applied to separate test panels of single strength window glass with a cheesecloth pad using light pressure and a circular polishing pattern for about 30 seconds. The panels were then buffed dry with a clean, dry pad of cheesecloth and conditioned for 20 minutes at about 23° C. The compositions employed in these examples are set forth in Table 3.

TABLE 3

| FORMULATION (parts by weight) | 9 | 10 | 11 |
|---|---|---|---|
| $\text{HO}-\underset{\underset{\text{OH}}{\mid}}{\overset{\overset{\text{OH}}{\mid}}{\text{Si}}}-\text{CH}_2\text{CH}_2\text{OCH}_2\text{CHCH SO}_3^-\text{H}^+$ | 2 | — | — |
| Abrasive Material | | | |
| Imsil A-25 | 10 | 10 | — |
| Thickening Aid | | | |
| "Keltrol" | 1 | 1 | — |
| Surfactant | | | |
| "Siponate DS-10" | — | 2 | 2 |
| Solvent | | | |
| 2-propanol | 5 | 5 | — |
| Deionized Water | 82 | 82 | 98 |

After conditioning, the test panels were subject to a 500 cycle Cyclic Wear Test. A Reliance ® All-Surface Writer, White No. 3366 was then used to make a wax mark on each of the test panels. The mark was easily removed from the panel of Example 9 with a stream of water from a wash bottle and gentle rubbing. However, the panels of Examples 10 and 11 required rinsing and vigorous rubbing in order to remove the marks.

EXAMPLES 12-14

One part cleaner-hydrophilic treatment compositions according to the invention were prepared and applied as described in Examples 1-3 to separate panels of single strength window glass. The panels were buffed dry with a clean dry pad of cheesecloth and conditioned for 24 hours at about 23° C. A Reliance ® All-Surface Writer, White No. 3366 was used to make a wax mark on each of the glass panels after they had been conditioned. The mark was easily removed from the panels by simply rinsing them with a stream of water from a wash bottle. This demonstrates the hydrophilic nature of the treated surfaces.

The formulations employed in the tests are set forth in Table 4. All amounts reported therein refer to parts by weight.

TABLE 4

| FORMULATION | 12 | 13 | 14 |
|---|---|---|---|
| $\text{HO}-\underset{\underset{\text{OH}}{\mid}}{\overset{\overset{\text{ONa}}{\mid}}{\text{Si}}}-\text{CH}_2\text{CH}_2\text{CH}_2\text{OCH}_2\text{CHCH}_2\text{SO}_3^-\text{Na}^+ \;\; \overset{\text{OH}}{\mid}$ | 2 | 2 | 2 |
| Abrasive Material | | | |
| Silicon Carbide-600 grit | 10 | — | — |
| Calcium Carbonate | — | 10 | — |
| Aluminum Oxide (Al₂O₃) | — | — | 10 |
| Thickening Aid | | | |
| Veegum HV (Magnesium aluminum silicate, available from R.T. Vanderbilt Company) | 4 | 4 | 4 |
| Solvent | | | |
| Deionized Water | 74 | 74 | 74 |
| 2-propanol | 10 | 10 | 10 |

EXAMPLE 15

One part cleaner-hydrophilic treatment compositions according to the invention were prepared. A composition of 2% by weight $$(\text{HO})_3-\underset{\underset{\text{OH}}{\mid}}{\text{Si}}-\text{CH}_2\text{CH}_2\text{CH}_2\text{OCH}_2\text{CHCH}_2\text{SO}_3^-\text{H}^+,$$

10% by weight abrasive material (Imsil A-25), 4% by weight thickening aid (Veegum K, a magnesium aluminum silicate available from R. T. Vanderbilt Company) and 84% by weight solvent (74% by weight deionized water and 10% by weight 2-propanol) was prepared by mixing the ingredients together. The thickening aid was added as an 8% by weight suspension in deionized water. The resultant composition had a pH of 1.6.

Portion of the composition were titrated with aqueous sodium hydroxide (1N) to various pH values. The pH values of the resultant compositions were 4, 6, 7, 8 and 10. The titrated compositions were then applied to separate panels of single strength window glass as described in Examples 1-3. One set of panels was treated immediately after preparation of the treatment composition and conditioned for 1 day at 23° C. Another set of panels was treated with the compositions approximately 12 days later and then conditioned for 1 day at 23° C.

The hydrophilic nature of each of the treated surfaces was demonstrated by marking the surfaces with a Reliance ® All-Surface Writer, White No. 3366. The resulting wax mark was easily removed from the treated panels both immediately after treatment and after conditioning. Removal was accomplished by simply rinsing the panels with a stream of water from a wash bottle. There was no perceptable difference in ease of removal of the wax marks from those panels treated immediately after preparation of the compositions and those from those panels treated after a 12 day period.

What is claimed is:

1. A one-part composition for imparting hydrophilicity to siliceous surfaces, said composition comprising
   (i) an aqueous solution of a sulfonato-organosilanol compound having at least one sulfonato-organic substituent, wherein the weight percentage of oxygen in said compound is at least about 30%, and the weight percentage of silicon in said compound is not greater than about 15%, said percentages being taken with reference to the water-free acid form of said compound; and
   (ii) an abrasive material.

2. A composition in accordance with claim 1 wherein said sulfonato-organosilanol compound as the formula $$\left[ \begin{array}{c} MO \\ \diagdown \\ Si(XCH_2SO_3^-)_{3-n} \\ \diagup \\ Q_n \end{array} \right] [Y]^{+r}{}_{2/nr}$$

wherein

Q is selected from hydroxyl, alkyl groups containing from 1 to about 4 carbon atoms and alkoxy groups containing from 1 to about 4 carbon atoms;

M is selected from hydrogen, alkali metals and organic cations of strong organic bases having a number average molecular weight of less than about 150 and a $pK_a$ of greater than about 11;

X is an organic linking group;

Y is selected from hydrogen, alkaline earth metals, cations of protonated weak bases having an average molecular weight of less than about 200 and a $pK_a$ of less than about 11 alkali metals and organic cations of strong organic bases having an average molecular weight of less than about 150 and a $pK_a$ of greater than about 11, provided that M is hydrogen when Y is selected from hydrogen, alkaline earth metals and organic cations of said protonated weak bases;

r is equal to the valence of Y; and n is 1 or 2.

3. A composition in accordance with claim 2 wherein X is selected from alkylene groups, cycloalkylene groups, alkyl substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups and substituted alkylarylene groups.

4. A composition in accordance with claim 2 wherein said sulfonato-organosilanol compound comprises an organosilanol-sulfonic acid of the formula $$\begin{array}{c} HO \\ \diagdown \\ Si(XCH_2SO_3^-)_{3-n}H^+{}_{2/n} \\ \diagup \\ Q_n \end{array}$$

5. A composition in accordance with claim 4 wherein said organosilanol-sulfonic acid has the formula $(HO)_3$-Si—X—$CH_2SO^-_3H^+$.

6. A composition in accordance with claim 5, wherein X is —$(CH_2)_m$—, where m is an integer of from 1 to about 8.

7. A composition in accordance with claim 6 wherein m is 1.

8. A composition in accordance with claim 6 wherein m is 2.

9. A composition in accordance with claim 5 wherein X is $$-CH_2CH_2CH_2OCH_2\overset{\overset{\displaystyle OH}{|}}{CH}-.$$

10. A composition in accordance with claim 4 wherein said organosilanol-sulfonic acid has the formula $$(HO)_2-Si\begin{array}{c} \diagup XCH_2SO_3^-H^+ \\ \diagdown XCH_2SO_3^-H^+ \end{array}$$

11. A composition in accordance with claim 10 wherein X is —$CH_2$—.

12. A composition in accordance with claim 4 wherein said organosilanol-sulfonic acid has the formula $$HO-\overset{\overset{\displaystyle Q}{|}}{\underset{\underset{\displaystyle Q}{|}}{Si}}-XCH_2SO_3^-H^+$$

wherein Q is an alkyl group containing from 1 to about 4 carbon atoms.

13. A composition in accordance with claim 2 wherein said sulfonato-organosilanol compound comprises an organosilanolate-sulfonic acid salt wherein M and Y are each selected from alkali metals and organic cations of strong organic bases having an average molecular weight of less than about 150 and a $pK_a$ of greater than about 11.

14. A composition in accordance with claim 13 wherein Q is selected from hydroxyl, alkyl groups containing from 1 to about 4 carbon atoms and alkoxy groups containing from 1 to about 4 carbon atoms provided that at least one of said Q groups is hydroxyl.

15. A composition in accordance with claim 13, wherein n is 2 and r is 1.

16. A composition in accordance with claim 2 wherein said sulfonato-organosilanol compound comprises an organosilanol-sulfonic acid salt wherein M is hydrogen; Q is selected from hydroxyl and alkyl groups of from 1 to about 4 carbon atoms and Y is selected from alkaline earth metals, cations of protonated weak bases having an average molecular weight of less than about 200 and a $pK_a$ of less than about 11, alkali metals and cations of strong organic bases having an average molecular weight of less than about 150 and a $pK_a$ of greater than about 11.

17. A composition in accordance with claim 16, wherein Q is hydroxyl.

18. A composition in accordance with claim 17, wherein n is 2 and r is 1.

19. A composition in accordance with claim 17 wherein n and r are each 1.

20. A composition in accordance with claim 1 further including a surfactant.

21. A composition in accordance with claim 1 further including a suspending agent.

22. A composition in accordance with claim 21 further including a surfactant.

* * * * *

UNITED STATES PATENT AND TRADEMARK OFFICE
CERTIFICATE OF CORRECTION

PATENT NO. : 4,152,165
DATED : May 1, 1979
INVENTOR(S) : Langager, et al

It is certified that error appears in the above-identified patent and that said Letters Patent are hereby corrected as shown below:

Column 2, line 20, change "composition" to --compositions--.

Column 3, line 15, change "solution" to --solutions--.

Column 7, line 3, change "Illinous" to --Illinois--.

Column 7, line 44, change "is" to --be--.

Column 8, line 41, change "("Siponate"]" to --("Siponate"--.

Column 8, line 42, change "dodecyldiphenylosidedisulfonate" to --dodecyldiphenyloxidedisulfonate--.

Column 9, line 11, change "5-50%" to --5-10%--.

Table 2, line 58, change "Imisil" to --Imsil--.

Table 2, line 59, change "Imisil" to --Imsil--.

Signed and Sealed this

Seventh Day of August 1979

[SEAL]

Attest:

Attesting Officer

LUTRELLE F. PARKER
*Acting Commissioner of Patents and Trademarks*

UNITED STATES PATENT AND TRADEMARK OFFICE
CERTIFICATE OF CORRECTION

PATENT NO. : 4,152,165
DATED : May 1, 1979
INVENTOR(S) : Langager, et al

It is certified that error appears in the above-identified patent and that said Letters Patent are hereby corrected as shown below:

Col. 2, line 33, change "pressuresensitive" to

--pressure-sensitive--.

Col. 4, line 56, change "of of" to --of--.

Col. 5, line 49, change "organosilanoate" to

--organosilanolate--.

Col. 12, lines 23 and 24, change "organosilanolsulfonic" to

--organosilanol-sulfonic--.

Col. 14, line 70, change "as" to --has--.

Col. 15, line 21, change "11alkali" to --11, alkali--.

Signed and Sealed this

Eighth Day of July 1980

[SEAL]

Attest:

SIDNEY A. DIAMOND

Attesting Officer

Commissioner of Patents and Trademarks